(12) United States Patent
Miura et al.

(10) Patent No.: US 12,124,786 B2
(45) Date of Patent: Oct. 22, 2024

(54) MODELING METHOD

(71) Applicant: Kioxia Corporation, Tokyo (JP)

(72) Inventors: Shimpei Miura, Mie Mie (JP); Hiroshi Tsukada, Yokkaichi Mie (JP); Kiminori Yoshino, Kuwana Mie (JP); Hiroyuki Tanizaki, Nagoya Aichi (JP)

(73) Assignee: KIOXIA CORPORATION, Tokyo (JP)

( * ) Notice: Subject to any disclaimer, the term of this patent is extended or adjusted under 35 U.S.C. 154(b) by 353 days.

(21) Appl. No.: 17/403,556

(22) Filed: Aug. 16, 2021

(65) Prior Publication Data

US 2022/0302102 A1 Sep. 22, 2022

(30) Foreign Application Priority Data

Mar. 18, 2021 (JP) .................. 2021-045246

(51) Int. Cl.
 *G06F 30/398* (2020.01)
 *H01L 27/02* (2006.01)
 *G06F 111/10* (2020.01)

(52) U.S. Cl.
 CPC ........ *G06F 30/398* (2020.01); *H01L 27/0207* (2013.01); *G06F 2111/10* (2020.01)

(58) Field of Classification Search
 CPC ..................................... G06F 30/398
 USPC ......................................... 716/111
 See application file for complete search history.

(56) References Cited

U.S. PATENT DOCUMENTS

2007/0187595 A1* 8/2007 Tanaka ............... G01N 23/2251
                                                                250/307
2021/0164770 A1   6/2021 Ohnishi

FOREIGN PATENT DOCUMENTS

JP           H10-269371 A      10/1998

* cited by examiner

*Primary Examiner* — Eric D Lee
(74) *Attorney, Agent, or Firm* — Foley & Lardner LLP (57) ABSTRACT

A modeling method of shape-approximating a shape measurement target provided in a structure having a stack structure by a boundary line, and a standard deviation is provided as a tolerance for a measurement value of the shape measurement target, and a calculation boundary line is arranged to converge within the tolerance, and thereby, a shape of the shape measurement target is expressed.

10 Claims, 8 Drawing Sheets

MODELING METHOD

CROSS-REFERENCE TO RELATED APPLICATION

This application is based upon and claims the benefit of priority from Japanese Patent Application No. 2021-045246, filed Mar. 18, 2021, the entire contents of which are incorporated herein by reference.

FIELD

Embodiments described herein relate generally to a modeling method.

BACKGROUND

Polynomial approximation is known as a method of expressing a result of measuring a three-dimensional shape of a depth, a side wall, or the like of a deep hole or a deep groove formed in a film-forming portion on a semiconductor substrate by using a cross-section scanning electron microscopy (SEM), a multi-wavelength light measurement device, or the like.

DETAILED DESCRIPTION

At least one embodiment provides a modeling method capable of preventing a decrease in measurement accuracy and reducing the number of parameters.

In general, according to at least one embodiment, a modeling method is a method of shape-approximating a shape measurement target by a boundary line and includes providing a predetermined tolerance to a measurement value of the shape measurement target, and arranging a calculation boundary line so as to converge within the tolerance to express a shape of the shape measurement target.

Hereinafter, embodiments will be described with reference to the drawings.

First Embodiment

1. Three-Dimensional Shape that Becomes Modeling Target

The present embodiment may be applied when a three-dimensional shape of a depth, a side wall, or the like of a deep hole or a deep groove provided in a structure body having a stack structure is modeled by polynomial approximation. For example, a modeling method according to at least one embodiment may be used for modeling a processing shape of a memory hole of a semiconductor memory device including a memory cell array of a NAND memory having a three-dimensional structure.

Figure 1:
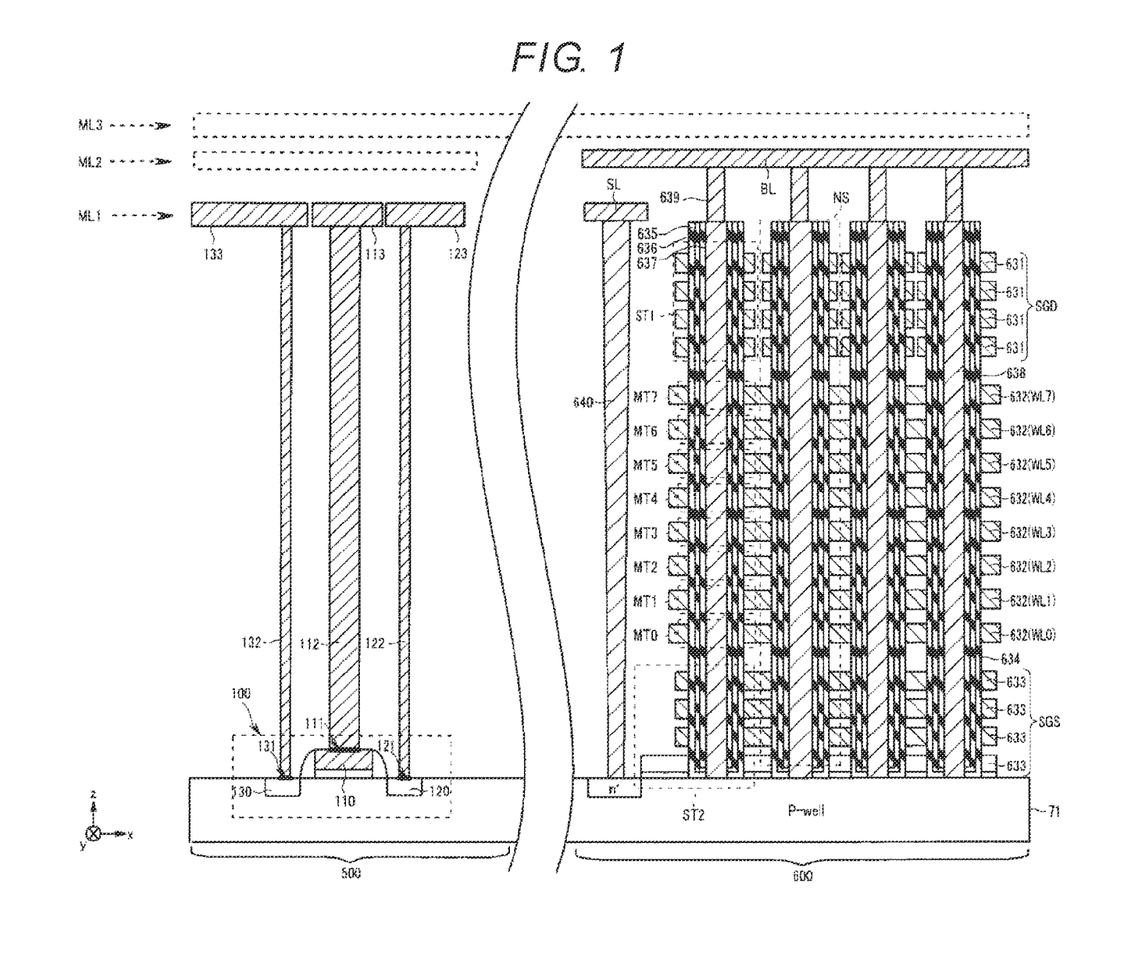
FIG. 1 is a cross-sectional view of a partial region of a semiconductor memory device including a memory cell array of a NAND memory having a three-dimensional structure.

FIG. 1 is a cross-sectional view of a partial region of a semiconductor memory device including a memory cell array of a NAND memory having a three-dimensional structure. FIG. 1 illustrates a partial region of the memory cell array and a peripheral circuit region. In the following description, a direction in which a bit line BL extends is referred to as an x direction, on a plane parallel to a surface of a semiconductor substrate 71. Further, a direction that is parallel to the surface of the semiconductor substrate 71 and is orthogonal to the x direction is referred to as a y direction. Further, a direction orthogonal to the surface of the semiconductor substrate 71 is referred to as a z direction. In at least one embodiment, a memory region 600 in which a memory circuit is formed is provided on a semiconductor substrate, and a peripheral circuit region 500 in which a peripheral circuit is formed is provided on the semiconductor substrate 71 around the memory region 600. That is, when viewed from the z direction, the memory region 600 and the peripheral circuit region 500 do not to overlap each other.

As illustrated in FIG. 1, a plurality of NAND strings NS are formed on a p-type well region (P-well). That is, a plurality of wiring layers 633 functioning as select gate lines SGS, a plurality of wiring layers 632 functioning as word lines WLi, and a plurality of wiring layers 631 functioning as select gate lines SGD are stacked on the p-type well region. FIG. 1 illustrates a structure in which eight wiring layers 632 functioning as the word lines WLi are stacked, and more wiring layers 632 such as 48 layers, 64 layers, and 96 layers may be stacked in the memory cell array of the semiconductor memory device.

Then, memory holes 634 penetrating the wiring layers 633, 632, and 631 to reach the p-type well region are formed. A block insulating film 635, a charge storage film 636, and a gate insulating film 637 are subsequently formed on a side surface of the memory hole 634, and a semiconductor column 638 is further buried in the memory hole 634. The semiconductor column 638 is formed of polysilicon, for example and functions as a region where channels are formed during an operation of memory cell transistors MT and select transistors ST1 and ST2 in NAND strings NS.

In each of the NAND strings NS, the select transistors ST2, a plurality of the memory cell transistors MT, and the select transistors ST1 are formed on the p-type well region. A wiring layer that functions as the bit line BL is formed above the semiconductor column 638. A contact plug 639 that connects the semiconductor column 638 to the bit line BL is formed at an upper end of the semiconductor column 638.

Further, an n$^+$-type impurity diffusion layer and a p$^+$-type impurity diffusion layer are formed in a surface of the p-type well region. A contact plug 640 is formed on the n$^+$-type impurity diffusion layer, and a wiring layer functioning as a source line SL is formed on the contact plug 640.

A plurality of configurations illustrated in FIG. 1 are arranged in a depth direction (y direction) of a paper surface of FIG. 1, and one string unit SU is formed by a set of a plurality of NAND strings arranged in a row in the depth direction.

Meanwhile, respective circuits in a peripheral circuit such as an input/output circuit are formed in the peripheral circuit region 500. For example, the above-described input/output circuit has a configuration in which logic gates such as an inverter are combined in multiple stages. Thus, multiple MOS transistors configuring a logic gate are formed in the peripheral circuit region 500. The multiple MOS transistors are formed on the semiconductor substrate 71 in the peripheral circuit region 500. FIG. 1 illustrates one of the MOS transistors. FIG. 1 schematically illustrates a cross-sectional structure of a non-volatile memory, and a size of the MOS transistor 100 illustrated in FIG. 1 and a ratio between elements configuring the MOS transistor 101 are different from an actual size and an actual ratio.

In the MOS transistor 100 configuring a peripheral circuit, a gate wiring 110 is formed on the semiconductor substrate 71 via a gate insulating film. The gate wiring 110 is, for example, a polysilicon film in which an impurity suitable for an operation of a MOS transistor is injected. A drain region 120 and a source region 130 are formed in the semiconductor substrates on the right and the left of the gate wiring 110 in the x direction. For example, when the MOS transistor 100 is an n-type MOS transistor (NMOS transistor), an impurity such as arsenic (As) or phosphorus (P) is injected into the drain region 120 and the source region 130 in the semiconductor substrate 71 and is diffused to a predetermined depth.

A metal wiring 113 for supplying a voltage to the gate wiring 110 via an insulating layer is formed above the gate wiring 110. A gate electrode 111 as a contact region is formed on the gate wiring 110. A contact plug 112 for electrically connecting the metal wiring 113 to the gate electrode 111 is formed on the gate electrode 111. That is, a voltage of the metal wiring 113 is supplied from the gate electrode 111 to the gate wiring 110 via the contact plug 112.

A metal wiring 123 for supplying a voltage to the drain region 120 via an insulating layer is formed above the drain region 120. A drain electrode 121 as a contact region is formed on the drain region 120. A contact plug 122 for electrically connecting the metal wiring 123 to the drain electrode 121 is formed on the drain electrode 121. That is, a voltage of the metal wiring 123 is supplied from the drain electrode 121 to the drain region 120 via the contact plug 122.

A metal wiring 133 for supplying a voltage to the source region 130 via an insulating layer is formed above the source region 130. A source electrode 131 as a contact region is formed on the source region 130. A contact plug 132 for electrically connecting the metal wiring 133 and the source electrode 131 is formed on the source electrode 131. That is, a voltage of the metal wiring 133 is supplied from the source electrode 131 to the source region 130 via the contact plug 132.

A wiring layer formed of a metal material, such as the bit line BL, the source line SL, or the metal wirings 133, 113, and 123 is formed above the NAND string NS after being formed. Usually, a wiring layer formed of a metal material includes a plurality of layers having an insulating film interposed therebetween. The example of FIG. 1 illustrates a case in which three wiring layers of ML1, ML2, and ML3 are provided. The bit line BL, the source line SL, and the metal wirings 133, 113, and 123 are formed in one or more of the wiring layers. For example, FIG. 1 illustrates a case in which the metal wirings 133, 113, and 123 and the source line SL are formed in the wiring layer ML1 of a first layer from the bottom and the bit line BL is formed in the wiring layer ML2 of a second layer from the bottom. For example, a wiring for transferring a power supply voltage is formed in the wiring layer ML3 of the uppermost layer.

Figure 2:
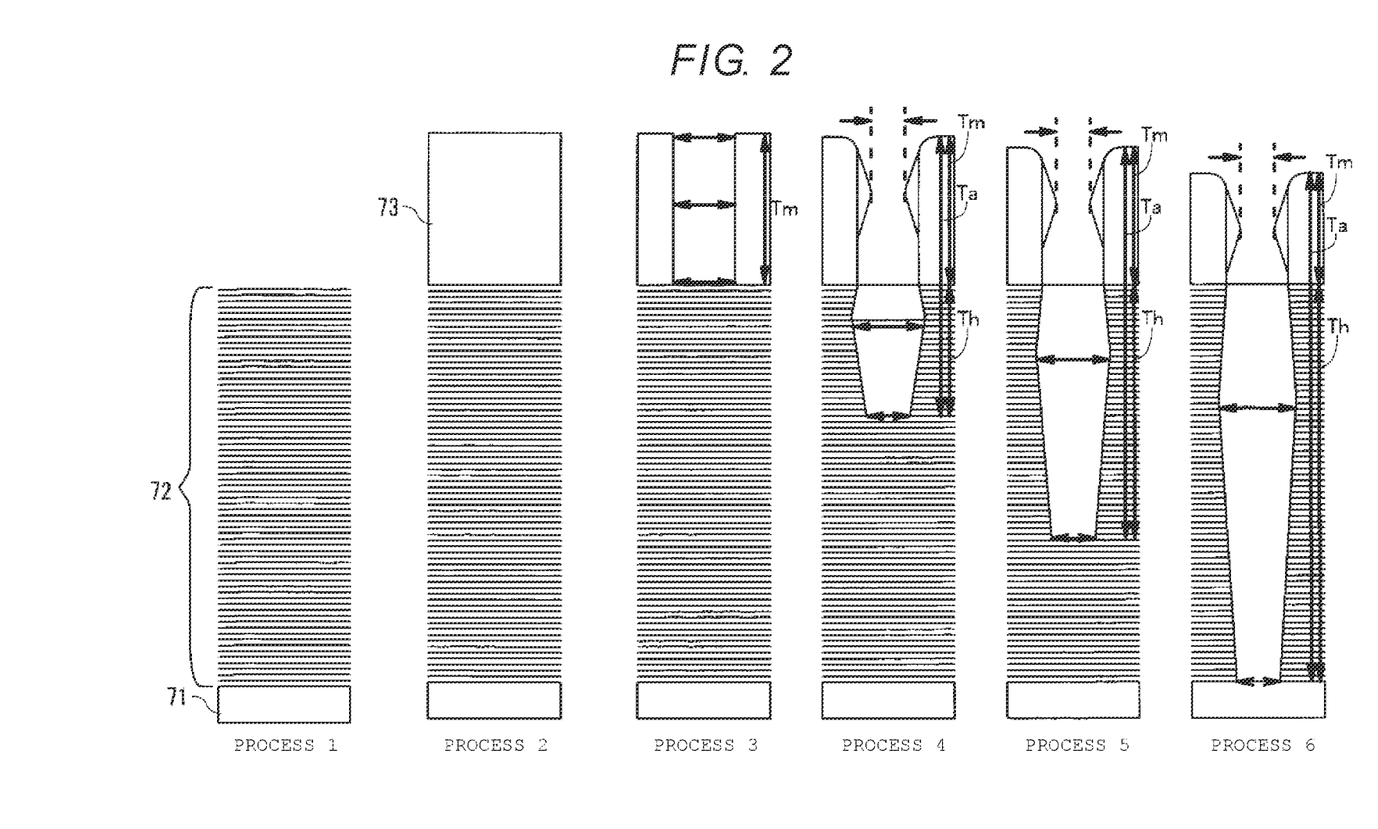
FIG. 2 is a schematic cross-sectional view illustrating processes of forming a memory hole.

Next, a method of forming the memory hole 634 in the semiconductor memory device having the structure illustrated in FIG. 1 will be described with reference to FIG. 2. FIG. 2 is a schematic cross-sectional view illustrating a process of forming the memory hole. The memory hole 634 is formed through, for example, a plurality of processes. FIG. 2 illustrates cross-sectional views of a plurality of processes for forming the memory hole 634 sequentially in time side by side from left to right.

First, in a first process (process 1), silicon oxide films and silicon nitride films are alternately deposited on the semiconductor substrate 71, and an ON stack film 72 is formed on the entire surface of the semiconductor substrate 71. In FIG. 2, a solid line corresponds to the silicon nitride film, and a blank adjacent to the solid line corresponds to the silicon oxide film. The silicon nitride films in the ON stack film 72 are replaced with conductive band films (for example, tungsten films) during a subsequent process and become the wiring layers 631, the wiring layers 632, and the wiring layers 633. The silicon oxide films in the ON stack film 72 become the insulating films between the wiring layers described above.

In the subsequent process (process 2), an etching mask film 73 is deposited on a surface of the ON stack film 72. For example, an amorphous carbon film or the like is used as the etching mask film 73. Then, in the next process (process 3), the etching mask film 73 located in a region where a memory hole is formed is removed, and an opening is formed in the etching mask film 73.

In subsequent processes (processes 4 to 6), the ON stack film 72 formed on a lower portion of the opening of the etching mask film 73 is removed by performing dry etching using the etching mask film 73 as a mask. The memory hole 634 is, for example, a hole having a diameter of approximately 100 nm and a depth of several μm and a high aspect ratio. Thus, an optimal etching condition may change in the process of forming the memory hole 634. Therefore, in the process of forming the memory hole 634, an etching condition changes in a plurality of stages. For example, at a time point when each predetermined stage is completed, etching is temporarily stopped, and a processing state (a residual film thickness of the etching mask film 73, an etching depth of the ON stack film 72, a cross-sectional shape, and so on) of a hole is measured. Then, the etching condition is adjusted according to the measured processing state, and etching of the next stage is performed. In FIG. 2, a cross section at an end time point of a certain stage is illustrated as process 4, and a cross section at an end time point of a stage subsequent to process 4 is illustrated as process 5. In addition, more "stages" for measuring the processing state and for adjusting the etching condition may be defined in the etching for forming a memory hole. Each time each stage is completed, the processing state is measured and fed back to adjustment of the etching condition of the next stage. Further, depending on the measurement result of the processing state, the etching condition of the next stage cannot be changed.

In FIG. 2, a cross section at an end time point of a stage subsequent to process 5 is illustrated as process 6. In process 6, all of the ON stack film 72 formed on the lower portion of the opening of the etching mask film 73 is removed, and forming the memory hole is completed. In FIG. 2, a residual film thickness of the etching mask film 73 is denoted as Tm, an etching depth of the ON stack film 72 is denoted as Th, and a depth from a surface of the etching mask film 73 to the bottom of the processed hole is denoted as Ta. That is, Tm+Th=Ta.

Figure 3:
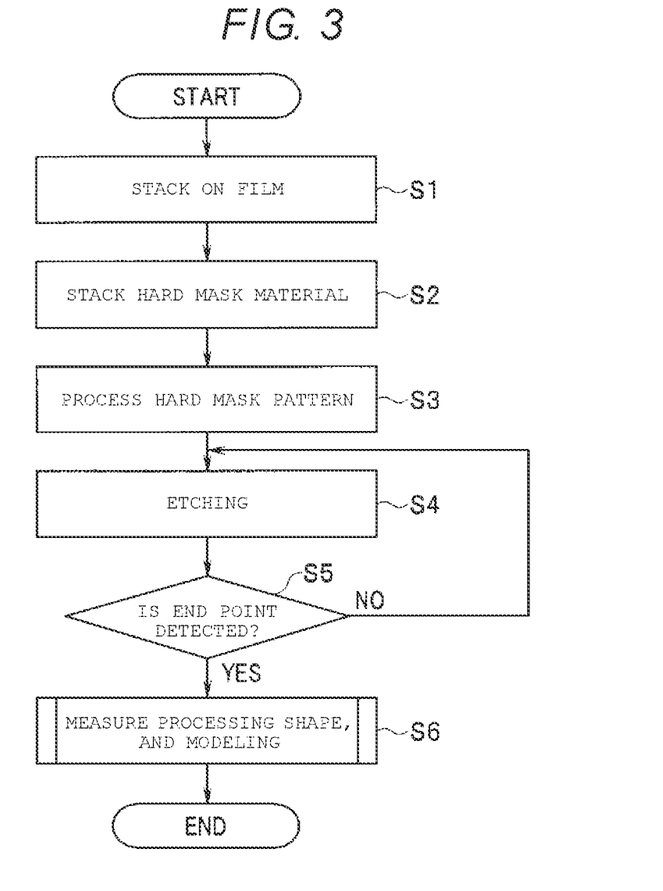
FIG. 3 is a flowchart illustrating an example of a procedure for forming the memory hole.

The modeling method according to at least one embodiment may be applied to modeling a three-dimensional shape of the memory hole 634 when processing is completed. FIG. 3 is a flowchart illustrating an example of a procedure for forming a memory hole.

First, the ON stack film 72 in which silicon oxide films and silicon nitride films are alternately deposited is formed on the semiconductor substrate 71 (step S1). Subsequently, amorphous carbon as a hard mask material is deposited on a surface of the ON stack film 72, and the etching mask film 73 is formed (step S2). Next, the etching mask film 73 formed in a region having a memory hole formed therein is removed, and an opening (memory hole pattern) is formed in the etching mask film 73 (step S3).

Subsequently, dry etching (anisotropic etching) of the ON stack film 72 is performed (step S4). As described above, since the ON stack film 72 has a large film thickness and a diameter of the memory hole is small, a hole with a high aspect ratio should be formed. Thus, the etching is performed in a plurality of stages. During the etching, detection (end point detection) of whether or not the semiconductor substrate 71 is exposed at the bottom of the opening is performed in order to determine the end of the etching (step S5). When the semiconductor substrate 71 is not detected (step S5, NO), the processing returns to step S4 and the etching is continued. Meanwhile, when the semiconductor substrate 71 is detected in the end point detection (step S5, YES), the hole formed by the etching is considered to penetrate the ON stack film 72, and the etching is stopped. Subsequently, a processing state of the hole is measured, shape modeling is performed based on the measurement result (step S6), and formation of the memory hole is completed.

2. Shape Modeling Method

Figure 4:
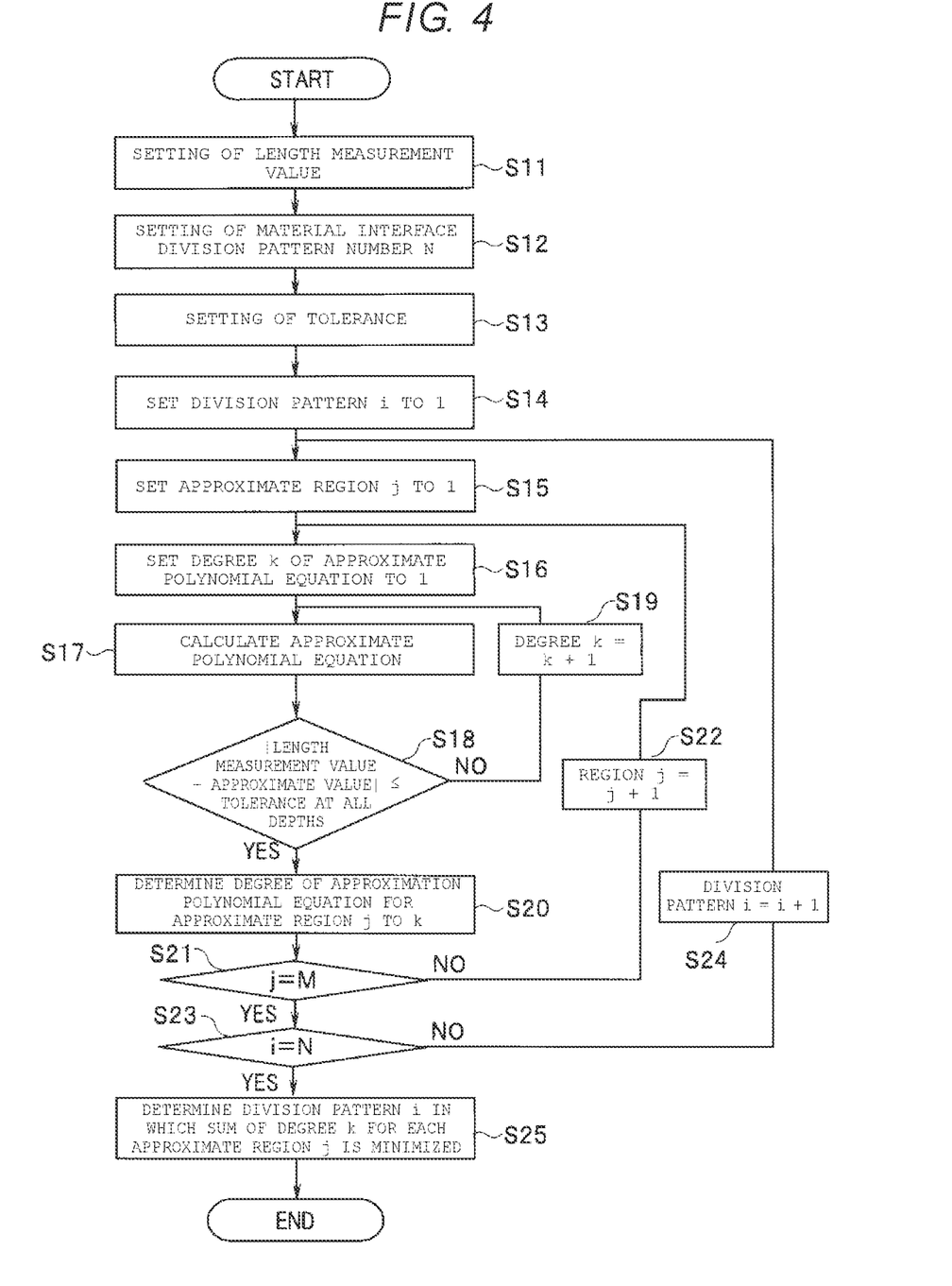
FIG. 4 is a flowchart illustrating an example of a three-dimensional shape modeling method according to at least one embodiment.

Next, the shape modeling method according to the embodiment will be described with reference to FIG. 4. FIG. 4 is a flowchart illustrating an example of a three-dimensional shape modeling method according to at least one embodiment. That is, a series of procedures illustrated in FIG. 4 may be applied to the shape modeling of step S6 of FIG. 3. Hereinafter, the shape modeling method according to at least one embodiment will be described by taking a processing hole illustrated in process 6 of FIG. 2 as an example.

First, data (length measurement value) required for shape modeling is set from the measurement result of a processing state of the hole (step S11). In step S11, for example, a radius of the hole (hereinafter referred to as a hole radius), a residual film thickness (=Tm) of the etching mask film 73, or an etching depth (=Th) of the ON stack film 72 is set as a length measurement value. For the hole radius, a plurality of length measurement values measured at different depths are set.

Next, in shape modeling, a division pattern of a range in which polynomial approximation is performed is set (step S12). The division pattern is set based on, for example, an interface of a material contained in a three-dimensional shape that becomes a target of shape modeling. The processing hole illustrated in process 6 of FIG. 2 is formed to penetrate a plurality of stacked films. Specifically, the processing hole is formed by penetrating (1) an interface between the etching mask film 73 and the ON stack film 72, and (2) interfaces between the silicon oxide films and the silicon nitride films in the ON stack film 72.

The present embodiment sets pattern 1 (approximate region number M=1) that represents the entire processing hole as one polynomial equation, and pattern 2 (approximate region number M=2) that a range in which polynomial approximation is performed is divided into two by the interface between the etching mask film 73 and the ON stack film 72. In this case, a division pattern number N=2.

The division pattern number N is not limited to 2. For example, when the entire processing hole is represented as one polynomial equation and the interface is not considered, only pattern 1 (approximate region number M=1) is set. In this case, the division pattern number N=1.

Further, the division pattern number N may be 3 or more. For example, when the ON stack film 72 is virtually divided into a lower portion and an upper portion (when an intermediate portion of the ON stack film 72 is defined as an interface), pattern 1 (approximate region number M=1) which represents the entire processing hole as one polynomial equation, pattern 2 (approximate region number M=2) that represents each of the etching mask film 73 and the ON stack film 72 as a polynomial equation, pattern 3 (approximate region number M=2) that represents each of upper portions of the etching mask film 73 and the ON stack film 72 and a lower portion of the ON stack film 72 as a polynomial equation, and pattern 4 (approximate region number M=3) that represents each of the upper portions of the etching mask film 73 and the ON stack film 72 and the lower portion of the ON stack film 72 as a polynomial equation are set. In this case, the division pattern number N=4.

Further, for example, (2) a range in which polynomial approximation is performed may be divided at the respective interfaces between the silicon oxide films and the silicon nitride films in the ON stack film 72. That is, for example, an interface is defined for a plurality of layers of silicon oxide films and silicon nitride films in the ON stack film 72 (for example, for each of three layers of the silicon oxide films and three layers of the silicon nitride films which are alternately deposited), and a range in which polynomial approximation is performed may be divided at each interface.

The range in which approximation is performed by one polynomial equation is called an approximate region. Pattern 1 according to at least one embodiment is a pattern that represents the entire processing hole as one polynomial equation, and an approximate region number M=1. An approximate region of pattern 1 includes a range from an upper surface of the etching mask film 73 to a lower surface of the ON stack film 72. That is, in FIG. 2, the approximate region is denoted by a range of Ta. In pattern 2 according to at least one embodiment, the approximate region number M=2. A first approximate region of pattern 2 includes a range from the upper surface of the etching mask film 73 to the interface between the etching mask film 73 and the ON stack film 72. A second approximate region of pattern 2 includes a range from the interface between the etching mask film 73 and the ON stack film 72 to the lower surface of the ON stack film 72. That is, in FIG. 2, the first approximate region of pattern 2 is denoted by a range of Tm, and the second approximate region is denoted by a range of Th.

Subsequently, an allowable error between an approximate value based on a polynomial equation and a length measurement value is set (step S13). In at least one embodiment, a standard deviation (σ) of the length measurement value is set as a tolerance (allowable error). For example, when modeling an average shape of x memory holes, the standard deviation (σ) of x length measurement values is calculated for each depth for measuring the length measurement value, and the calculated value is set as the allowable error. That is, different values for each depth may be set as the allowable error.

Next, polynomial approximation is performed for each of the plurality of division patterns set in step S13 (step S14 to step S24). First, pattern 1 is set as a division pattern (=i) in which polynomial approximation is performed (step S14). Next, an approximate region (=j) where a polynomial equation is generated is set in the set pattern (step S15). Subsequently, 1 is set as a degree (=k) of a polynomial equation to be generated (step S16). A length measurement value of a hole radius in the selected approximate region is fitted to a polynomial equation of a set degree, and coefficients of each term are calculated (step S17).

Subsequently, a difference between the length measurement value and the approximate value calculated by the polynomial equation obtained in step S17 at the same depth as the length measurement value is calculated (step S18). When differences between all the length measurement values in the approximate region and the approximate value are less than the allowable error (for example, the standard deviation σ) set in step S13 (step S18, YES), polynomial fitting for the approximate region is completed. Meanwhile, when there is an approximate value in which the difference with the length measurement value exceeds the allowable error (step S18, NO), a degree of the polynomial equation is incremented by 1 (step S19), and then the processing returns to step S17 and the polynomial fitting is performed again.

If the polynomial fitting for a target approximate region is completed, the degree of the approximate polynomial equation for the approximate region is determined (step S20). When a number j of the approximate regions in which calculation of the approximate polynomial equation is completed does not reach the approximate region number M in the set division pattern, that is, when there is an approximate region for which the approximate polynomial equation is not calculated in the set division pattern (step S21, NO), the next approximate region is set (step S22), and then the processing returns to step S16, and polynomial fitting for the approximate region is performed again.

When the number j of the approximate regions for which the calculation of the approximate polynomial equation is completed reaches the approximate region number M in a target division pattern, that is, when calculation of the approximate polynomial equation is completed for all the approximate regions in the target division pattern (step S21, YES), it is determined whether or not the calculation of the approximate polynomial equation is completed for the division pattern set in step S12 (step S23). When there is a division pattern for which the approximate polynomial equation is not calculated (step S23, NO), the next division pattern is set (step S24), and then the processing returns to step S15, and the polynomial fitting is performed for all the approximate regions in the division pattern.

Meanwhile, when the calculation of the approximate polynomial equation is completed for all the division patterns (step S23, YES), the degree (calculation parameter number) is calculated for each division pattern (step S25). The calculation parameter number is the sum of parameter numbers of the approximate polynomial equation in all the approximate regions in a target pattern. For example, since the approximate region number in pattern 1 is 1, an approximate polynomial equation to be calculated is one. Thus, a calculation parameter number of pattern 1 becomes a value obtained by adding 1 of a constant term to a degree of the approximate polynomial equation determined in step S20. For a division pattern in which there are a plurality of division methods for an approximate region, the calculation parameter number is calculated for each division method. Then, a division method of the smallest calculation parameter number is used for the calculation parameter number of the division pattern.

Figure 5:
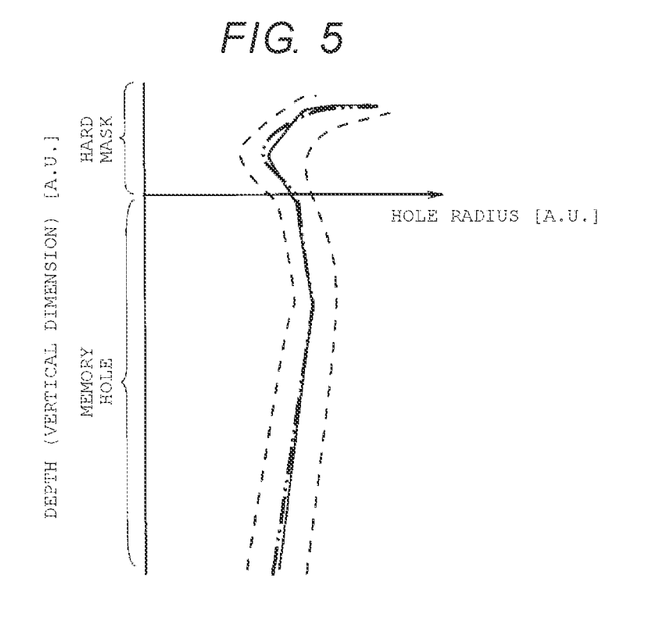
FIG. 5 is a diagram illustrating an example of a profile of an approximate polynomial equation calculated by the method according to at least one embodiment.
Figure 6:
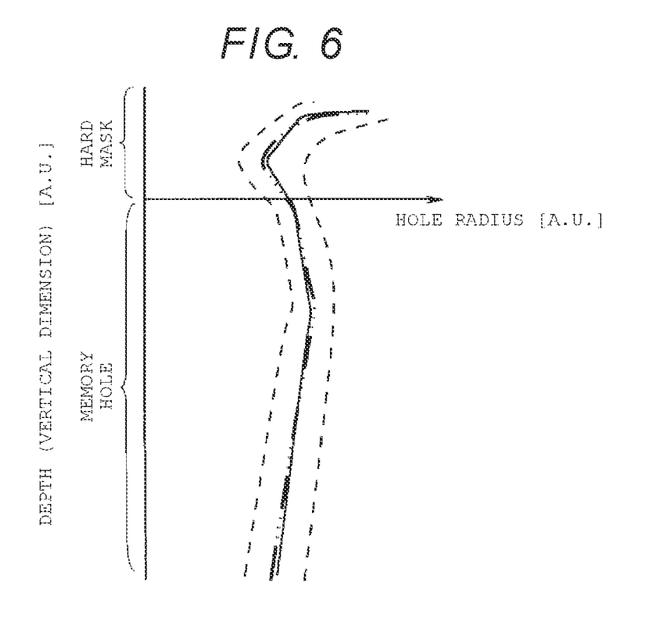
FIG. 6 is a diagram illustrating an example of a profile of an approximate polynomial equation calculated by the method according to at least one embodiment.
Figure 7:
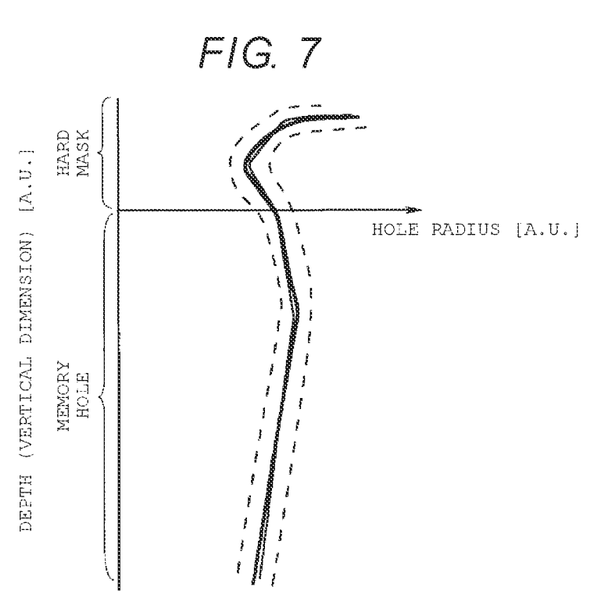
FIG. 7 is a diagram illustrating an example of a profile of an approximate polynomial equation according to a comparative example.

FIGS. 5 and 6 are diagrams illustrating examples of a profile of an approximate polynomial equation calculated by using the method according to at least one embodiment. FIG. 5 illustrates an example of an actually measured shape profile and an approximate shape profile represented by an approximate polynomial equation corresponding to pattern 1 of an approximate polynomial calculation method according to at least one embodiment. FIG. 6 illustrates an example of the actually measured shape profile and an approximate shape profile represented by an approximate polynomial equation corresponding to pattern 2 of the approximate polynomial calculation method according to at least one embodiment. Further, FIG. 7 is a diagram illustrating an example of an approximate shape profile represented by an approximate polynomial equation according to a comparative example. FIGS. 5 to 7 are diagrams illustrating a shape profile in which a horizontal axis denotes a hole radius and a vertical axis denotes a depth, and a solid line indicates a length measurement value. In FIGS. 5 and 6, a dashed line illustrated on the left of the length measurement value is a boundary line (lower limit) obtained by subtracting a tolerance (for example, standard deviation σ) from the length measurement value. A dashed line illustrated on the right of the length measurement value is a boundary line (upper limit) obtained by adding the tolerance (for example, standard deviation σ) to the length measurement value.

FIG. 5 illustrates an approximate shape profile represented by an approximate polynomial equation corresponding to pattern 1 of the approximate polynomial calculation method according to at least one embodiment, together with the actually measured shape profile. In FIG. 5, an alternate long and two short dashes line corresponds to the approximate shape profile, and the approximate shape profile is represented by an approximate polynomial equation calculated by the method according to at least one embodiment. In pattern 1 of the approximate polynomial calculation method according to the embodiment, the approximate polynomial equation is calculated by using the entire range from an upper surface of the etching mask film 73 to a lower surface of the ON stack film 72 as one approximate region. Thus, the approximate shape profile of FIG. 5 is represented by one kind of approximate polynomial equation. For example, a degree of the approximate polynomial equation for representing the approximate shape profile of FIG. 5 is 13, and a calculation parameter number is 14.

When there is a division pattern for which a calculation parameter is not calculated, the processing returns to step S14 and the next pattern is selected. Then, a series of procedures in step S15 to step S20 are performed for the selected division pattern. In the above-described example, if the calculation parameter number for pattern 1 is calculated in step S21, the processing returns to step S15, and an approximate polynomial equation and a calculation parameter number for the pattern 2 are calculated.

Since the approximate region number is 2 in pattern 2, a procedure of step S16 to step S20 is performed for each of two approximate regions, and the approximate polynomial equation is calculated.

FIG. 6 illustrates the approximate shape profile represented by the approximate polynomial equation corresponding to pattern 2 of the approximate polynomial calculation method according to at least one embodiment, together with the actually measured shape profile. In FIG. 6, sparse dashed lines indicate an approximate shape profile represented by the approximate polynomial equation calculated by the method according to at least one embodiment, for a first approximate region (a range from an upper surface of the etching mask film 73 to an interface between the etching mask film 73 and the ON stack film 72). Further, an alternate long and three short dashes line indicates an approximate shape profile represented by the approximate polynomial equation calculated by the method according to at least one embodiment, fora second approximate region (a range from the interface between the etching mask film 73 and the ON stack film 72 to a lower surface of the ON stack film 72). For example, a degree of the approximate polynomial equation calculated in the first approximate region is 6, and a degree of the approximate polynomial equation calculated in the second approximate region is 5. In this case, the calculation parameter number of the approximate polynomial equation for representing the approximate shape profile of FIG. 6 is $(6+1)+(5+1)=13$.

If calculation of a calculation parameter for all the division patterns is completed, a minimum calculation parameter number is determined (step S22). That is, among the calculation parameter numbers of the approximate polynomial equation calculated to obtain the approximate shape profile for each division pattern, the smallest number is set as a minimum calculation parameter number. In the above-described example, the calculation parameter number of the approximate polynomial equation calculated for pattern 1 is 14, and the calculation parameter number of the approximate polynomial equation calculated for pattern 2 is 13, and thus, a minimum calculation parameter number is 13. By performing a procedure from step S11 to step S22 described above, modeling of a three-dimensional shape of a target hole is performed.

Meanwhile, according to the comparative example, an average error (for example, 0.3 nm) of all the length measurement values is set as an allowable error, and an approximate polynomial equation is calculated under the condition of converging within an allowable error range as illustrated in FIG. 7. In FIG. 7, sparse dashed lines indicate an allowable error, and a solid line indicates an approximate shape profile represented by an approximate polynomial equation calculated under the condition of converging within the allowable error range. Likewise pattern 2 described above, when a hole is divided at the interface between the etching mask film 73 and the ON stack film 72, and when an approximate polynomial equation is calculated for each of two approximate regions, for example, a degree of the approximate polynomial equation of the first approximate region is 11, a degree of the approximate polynomial equation of the second approximate region is 15, and a calculation parameter number is $(11+1)+(15+1)=28$.

The modeling method according to at least one embodiment can reduce a calculation parameter number when compared with the modeling method according to the comparative example. At the time of modeling by a polynomial equation, as a shape of a hole is more complicated, a parameter number required for approximation, that is, a degree of a polynomial equation increases. If the parameter number increases, measurement accuracy can be reduced, for example, a calculation result can converge to an incorrect value due to a parameter correlation. Therefore, when a shape is modeled by using polynomial approximation, it is preferable that a calculation parameter number is small.

As described above, according to the modeling method of at least one embodiment, a standard deviation of a length measurement value is set as a tolerance, and an approximate polynomial equation is calculated by converging within a tolerance. An error of the length measurement value varies depending on depth positions, and thus, by setting the standard deviation as an allowable range, the allowable range can be increased at a position where the variation is large and can be reduced at a position where the variation is small. Therefore, measurement accuracy can be prevented from being decreased, and a calculation parameter number can be reduced as compared with a case in which modeling is performed by using an allowable error as a fixed value.

Further, in at least one embodiment, when a shape of a hole penetrating a stack film is modeled, an approximate region can be set at an interface between certain films, and an approximate polynomial equation can be generated for each approximate region. It is possible to set approximate regions at all interfaces, and it is also possible to set a region where the amount of changes in a length measurement value is small so as to belong to the same approximate region without setting the approximate region. For example, a silicon oxide film and a silicon nitride film forming the ON stack film 72 can be set as the same approximate region without dividing a region at an interface between the silicon oxide film and the silicon nitride film. By setting a plurality of division patterns by changing an interface position for setting an approximate region, and by calculating a calculation parameter number for each division pattern, an optimum division pattern having the minimized calculation parameter number can be selected. In the above description, the standard deviation ($\sigma$) is used as a tolerance, and another statistical value such as $3\sigma$ may be used as the tolerance.

As described above, the modeling method according to at least one embodiment is not only applicable to shape modeling of a hole (memory hole) that is processed but also used for modeling of various other shapes. For example, the modeling method can also be used for shape modeling of a hole at a specific processing stage during processing.

Figure 8:
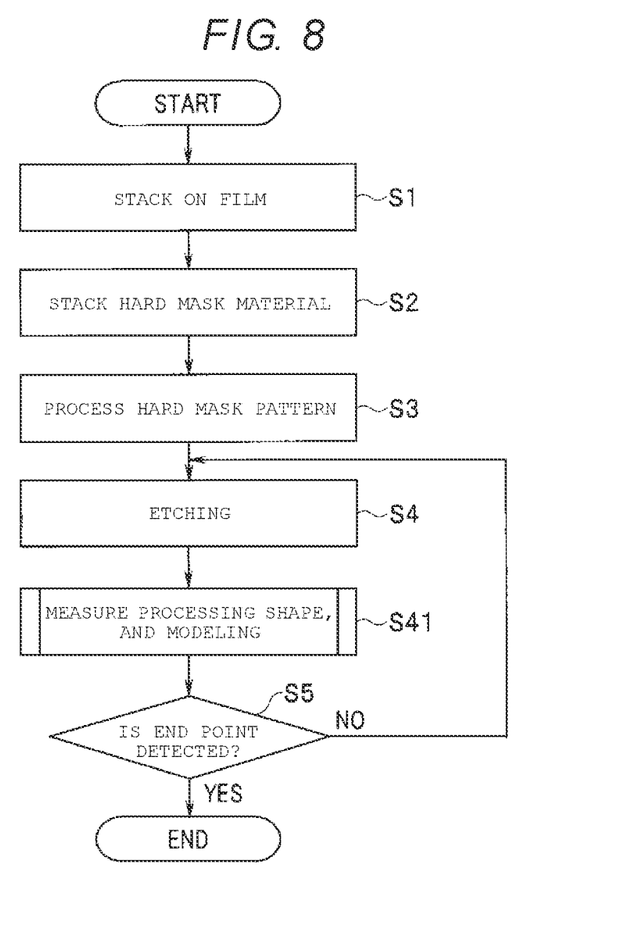
FIG. 8 is another flowchart illustrating an example of a procedure for forming the memory hole.

FIG. 8 is another flowchart illustrating an example of a procedure for forming a memory hole. The flowchart illustrated in FIG. 8 is different from the flowchart illustrated in FIG. 3 in that a procedure of the processing shape measurement and the shape modeling (step S6), which is performed after the end point detection (step S5, YES), is performed after the etching (step S4) is completed and before the end point detection is performed. For example, the modeling method according to the embodiment may also be applied to the shape of the processing hole illustrated in process 4 and process 5 of FIG. 2.

Figure 9:
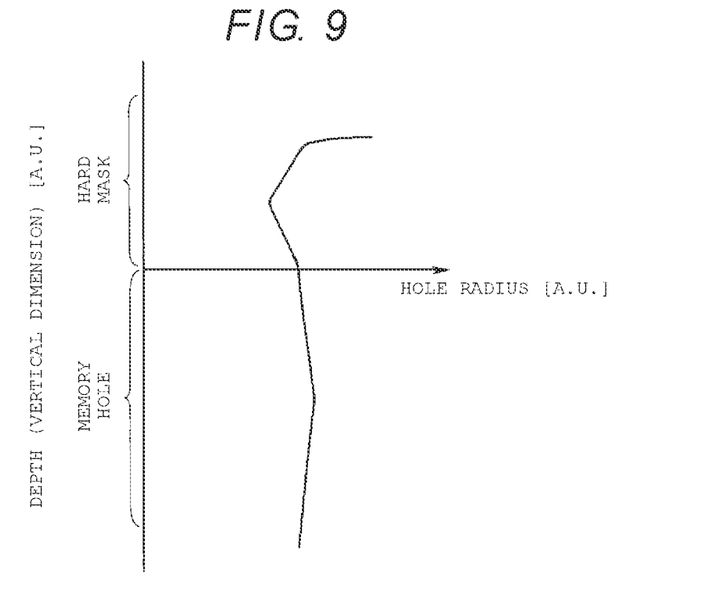
FIG. 9 is a diagram illustrating an example of a profile of a length measurement value at a specific processing stage.
Figure 10:
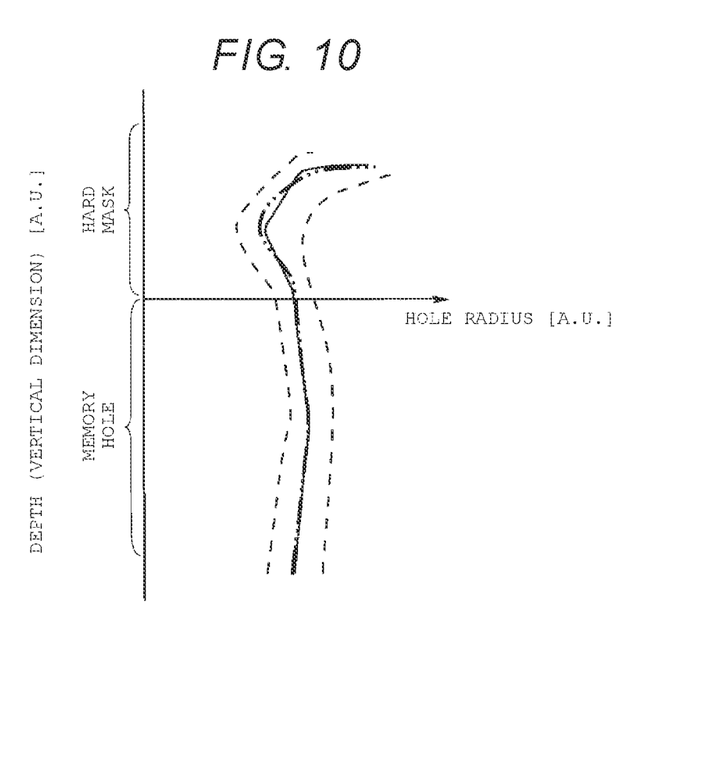
FIG. 10 is a diagram illustrating an example of a boundary region to be set as a convergence range of an approximate polynomial equation, for a length measurement value illustrated in FIG. 9.

For example, when the shape of the processing hole illustrated in process 5 of FIG. 2 is represented by using the modeling method according to at least one embodiment, a boundary region having a tolerance as an allowable error for the length measurement value can be set for the length measurement value illustrated in FIG. 9 as illustrated in FIG. 10, and by performing the procedure illustrated in FIG. 4, an approximate polynomial equation can be calculated. FIG. 9 is a diagram illustrating an example of a profile of a length measurement value at a specific processing stage. Further, FIG. 10 is a diagram illustrating an example of a boundary region set as a convergence range of an approximate polynomial equation, for the length measurement value illustrated in FIG. 9.

As described above, the modeling method according to at least one embodiment is not only applicable to an inspection (modeling of a processing shape) of an etching process (particularly, an etching process of forming a hole with a large aspect ratio such as a memory hole) for manufacturing the semiconductor memory device as described above but also used in various other situations. For example, the modeling method may also be applied to optimization of an etching condition prior to manufacture of products. When each stage of etching is completed, a shape profile is measured by using the modeling method according to at least one embodiment, and thereby, an optimum parameter (etching condition) can be determined at each stage of etching. Thereby, processing can be performed under the optimum process condition when manufacturing products, and thus, processing accuracy can be increased and product yield can be increased.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A modeling method comprising:
   dividing a shape measurement target with reference to a material interface and setting an approximate region;
   setting one or more division patterns in which positions of division planes for defining the approximate region are different from each other;
   providing a predetermined tolerance to a measurement value of the shape measurement target;
   shape-approximating the shape measurement target so as to converge within the predetermined tolerance by a mathematically-expressed shape model;
   selecting a pattern capable of being expressed by a minimum dimension number from among all approximated division patterns; and
   expressing a shape of the shape measurement target by a mathematical expression in which the dimension number is minimized.

2. The modeling method according to claim 1, further comprising:
   performing a polynomial approximation from a minimum degree for the approximate region;
   when a residual difference between the measurement value of the shape measurement target and an approximate value calculated by the polynomial approximation exceeds the tolerance, repeating the polynomial approximation by increasing the degree by 1,
   wherein a degree of a polynomial equation at a time point when the residual difference falls below the tolerance for all measurement positions is defined as a partial polynomial degree;
   summing the partial polynomial degree of the approximate region configuring the one or more division patterns to obtain a shape expression degree of the one or more division patterns; and
   expressing a shape of the shape measurement target by using a polynomial equation in a division pattern of the one or more division patterns, a division pattern of the one or more division patterns having a minimum shape expression degree from a division pattern of the one or more division patterns subjected to the polynomial approximation.

3. The modeling method according to claim 2, wherein the division pattern of the one or more division patterns subject to polynomial approximation is randomly selectable from among all the division patterns.

4. The modeling method according to claim 1, wherein the division pattern of the one or more division patterns subject to polynomial approximation is randomly selectable from among all the division patterns.

5. The modeling method according to claim 1, wherein the shape measurement target corresponds to a structure of a memory device.

6. The modeling method according to claim 5, wherein the memory device includes a NAND memory.

7. The modeling method according to claim 5, wherein the structure of the memory device includes a memory hole.

8. The modeling method according to claim 7, wherein the structure of the memory device includes stacked layers, the memory hole penetrating the stacked layers.

9. The modeling method according to claim 1, wherein the shape measurement target corresponds to a hole structure, the measurement value including a radius of the hole structure.

10. The modeling method according to claim 1, wherein the shape measurement target corresponds to a structure, and further comprising physically processing the structure based on the expressing a shape of the shape measurement target.

* * * * *